(12) United States Patent
Wasden et al.

(10) Patent No.: US 9,049,037 B2
(45) Date of Patent: Jun. 2, 2015

(54) METHOD AND SYSTEM FOR MONITORING AND ENCODING SIGNALS IN A LOCAL FACILITY AND COMMUNICATING THE SIGNALS BETWEEN A LOCAL COLLECTION FACILITY AND A REMOTE FACILITY USING AN IP NETWORK

(75) Inventors: Mitchell B. Wasden, Redondo Beach, CA (US); Vishal Arya, Los Angeles, CA (US); Daniel M. Miner, Redondo Beach, CA (US); Darren M. St. Laurent, Stevenson Ranch, CA (US); David T. Boltz, La Mirada, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1167 days.

(21) Appl. No.: 11/930,390

(22) Filed: Oct. 31, 2007

(65) Prior Publication Data

US 2009/0109883 A1 Apr. 30, 2009

(51) Int. Cl.
*H04B 1/44* (2006.01)
*H04L 12/26* (2006.01)
*H04L 12/24* (2006.01)

(52) U.S. Cl.
CPC ......... *H04L 12/2602* (2013.01); *H04L 41/0668* (2013.01); *H04L 43/00* (2013.01); *H04L 43/0829* (2013.01); *H04L 43/0847* (2013.01)

(58) Field of Classification Search
CPC . H04L 12/2602; H04L 41/0668; H04L 43/00; H04L 43/0847
USPC .......................................................... 455/78
See application file for complete search history.

(56) References Cited

U.S. PATENT DOCUMENTS

| 4,317,010 | A | 2/1982 | Fillot |
|---|---|---|---|
| 4,984,252 | A | 1/1991 | Morimoto |
| 5,155,483 | A | 10/1992 | Morimoto |
| 5,189,516 | A | 2/1993 | Angell et al. |
| 5,257,106 | A | 10/1993 | Maruoka |
| 5,323,322 | A | 6/1994 | Mueller et al. |
| 5,327,421 | A | 7/1994 | Hiller et al. |
| 5,351,130 | A | 9/1994 | Dugan et al. |
| 5,452,297 | A | 9/1995 | Hiller et al. |
| 5,463,656 | A | 10/1995 | Polivka et al. |
| 5,499,046 | A | 3/1996 | Schiller et al. |
| 5,513,180 | A | 4/1996 | Miyake et al. |
| 5,524,113 | A | 6/1996 | Gaddis |
| 5,566,353 | A | 10/1996 | Cho et al. |
| 5,583,562 | A | 12/1996 | Birch et al. |
| 5,600,573 | A | * | 2/1997 | Hendricks et al. ............ 725/109 |

(Continued)

OTHER PUBLICATIONS

"Specification for the Use of Video and Audio Coding in DVB Services Delivered Directly Over IP Protocols"; DVB Document Rev. 2; May 2007.
Non-final Office action dated Aug. 4, 2010 in U.S. Appl. No. 11/929,252, filed Oct. 30, 2007 by Mitchell B. Wasden et al.

*Primary Examiner* — David Bilodeau (57) ABSTRACT

A system and method for collecting signals includes an IP network, a remote facility and a local collection facility in communication with the local collection facility through the IP network. The local collection facility receives channel signals, encoding the channel signals into respective IP signals, communicating the respective IP signals through an IP network to the remote facility. The remote facility controls an antenna switch at the local collection facility to communicate a first channel signal of the channel signals to a monitoring receiver circuit module. The local collection facility generates a monitoring signal at the monitoring receiver circuit module and communicates the monitoring signal through to a remote facility through the IP network.

22 Claims, 9 Drawing Sheets

(56) References Cited

U.S. PATENT DOCUMENTS

| | | | |
|---|---|---|---|
| 5,640,673 A | 6/1997 | Tanabe |
| 5,646,675 A | 7/1997 | Copriviza et al. |
| 5,659,350 A | 8/1997 | Hendricks et al. |
| 5,666,487 A | 9/1997 | Goodman et al. |
| 5,684,714 A | 11/1997 | Yogeshwar et al. |
| 5,708,961 A | 1/1998 | Hylton et al. |
| 5,793,413 A | 8/1998 | Hylton et al. |
| 5,926,230 A | 7/1999 | Nijima et al. |
| 5,930,251 A | 7/1999 | Murakami et al. |
| 5,933,123 A | 8/1999 | Kaul |
| 5,949,766 A | 9/1999 | Ibanez-Meier et al. |
| 5,999,518 A | 12/1999 | Nattkemper et al. |
| 6,047,162 A | 4/2000 | Lazaris-Brunner et al. |
| 6,154,772 A | 11/2000 | Dunn et al. |
| 6,272,137 B1 | 8/2001 | Noiri |
| 6,308,286 B1 | 10/2001 | Richmond et al. |
| 6,373,817 B1 | 4/2002 | Kung et al. |
| 6,400,720 B1 | 6/2002 | Ovadia et al. |
| 6,401,242 B1 | 6/2002 | Eyer et al. |
| 6,434,562 B1 | 8/2002 | Pennywitt et al. |
| 6,490,273 B1 | 12/2002 | DeNap et al. |
| 6,496,522 B1 | 12/2002 | Takizawa et al. |
| 6,510,163 B1 | 1/2003 | Won |
| 6,557,031 B1 | 4/2003 | Mimura et al. |
| 6,625,811 B1 | 9/2003 | Kaneko |
| 6,654,923 B1 | 11/2003 | Grenier et al. |
| 6,724,760 B2 | 4/2004 | Uchida |
| 6,724,774 B1 | 4/2004 | Sashide |
| 6,741,553 B1 | 5/2004 | Grenier |
| 6,751,214 B1 | 6/2004 | Parruck et al. |
| 6,782,550 B1 | 8/2004 | Cao |
| 6,795,506 B1 | 9/2004 | Zhang et al. |
| 6,796,555 B1 | 9/2004 | Blahut |
| 6,910,078 B1 | 6/2005 | Raman et al. |
| 6,963,547 B1 | 11/2005 | Kwak et al. |
| 7,039,116 B1 | 5/2006 | Zhang et al. |
| 7,039,937 B1 | 5/2006 | Glenn |
| 7,072,365 B1 | 7/2006 | Ansley |
| 7,080,398 B1 | 7/2006 | Wichelman et al. |
| 7,088,981 B2 | 8/2006 | Chang |
| 7,133,377 B1 | 11/2006 | Mullins et al. |
| 7,209,636 B2 | 4/2007 | Imahashi et al. |
| 7,212,738 B1 | 5/2007 | Wang |
| 7,219,367 B2 | 5/2007 | Briggs |
| 7,224,837 B2 | 5/2007 | Olshansky et al. |
| 7,260,369 B2 | 8/2007 | Feher |
| 7,302,224 B2 | 11/2007 | Sibley et al. |
| 7,315,887 B1 | 1/2008 | Liang et al. |
| 7,333,425 B2 | 2/2008 | Huck et al. |
| 7,346,918 B2 * | 3/2008 | Hennenhoefer et al. ........ 725/74 |
| 7,380,264 B2 | 5/2008 | Potrebic |
| 7,460,832 B2 | 12/2008 | Lee et al. |
| 7,493,648 B2 | 2/2009 | Hisamatsu et al. |
| 7,525,993 B2 | 4/2009 | Yousef |
| 7,529,276 B1 | 5/2009 | Ramakrishnan |
| 7,580,612 B2 | 8/2009 | Sato et al. |
| 7,596,350 B1 | 9/2009 | Ladrach |
| 7,602,846 B1 | 10/2009 | Wu et al. |
| 7,607,154 B2 | 10/2009 | Morello |
| 7,650,620 B2 | 1/2010 | Fish et al. |
| 7,746,791 B2 | 6/2010 | Wimmer |
| 8,139,517 B2 | 3/2012 | Oger et al. |
| 2001/0003846 A1 * | 6/2001 | Rowe et al. ........................ 725/47 |
| 2001/0026537 A1 * | 10/2001 | Massey ........................... 370/316 |
| 2001/0036198 A1 | 11/2001 | Arsenault et al. |
| 2002/0007494 A1 | 1/2002 | Hodge |
| 2002/0023165 A1 | 2/2002 | Lahr |
| 2002/0053049 A1 | 5/2002 | Shiomoto et al. |
| 2002/0061023 A1 | 5/2002 | Takizawa et al. |
| 2002/0105976 A1 | 8/2002 | Kelly et al. |
| 2002/0150061 A1 | 10/2002 | Arsenault |
| 2002/0186320 A1 | 12/2002 | Carlsgaard et al. |
| 2003/0007564 A1 | 1/2003 | Jeong |
| 2003/0018975 A1 | 1/2003 | Stone |
| 2003/0088873 A1 | 5/2003 | McCoy et al. |
| 2003/0095554 A1 | 5/2003 | Shimizu |
| 2003/0140353 A1 | 7/2003 | Hugenberg et al. |
| 2003/0161262 A1 | 8/2003 | Hosoi |
| 2003/0196211 A1 | 10/2003 | Chan |
| 2003/0217362 A1 * | 11/2003 | Summers et al. ................ 725/63 |
| 2004/0001478 A1 | 1/2004 | Wong |
| 2004/0022275 A1 | 2/2004 | Blanchard |
| 2004/0022535 A1 * | 2/2004 | Wang et al. ....................... 398/2 |
| 2004/0078807 A1 | 4/2004 | Fries et al. |
| 2004/0117831 A1 | 6/2004 | Ellis et al. |
| 2004/0120349 A1 | 6/2004 | Border et al. |
| 2004/0181813 A1 | 9/2004 | Ota et al. |
| 2004/0213247 A1 | 10/2004 | Seki et al. |
| 2004/0216171 A1 | 10/2004 | Barone et al. |
| 2005/0086696 A1 | 4/2005 | Daniels |
| 2005/0099969 A1 | 5/2005 | Roberts et al. |
| 2005/0155079 A1 | 7/2005 | Chen et al. |
| 2005/0160477 A1 | 7/2005 | Saito |
| 2005/0175085 A1 | 8/2005 | Bergen et al. |
| 2005/0210123 A1 | 9/2005 | Wang et al. |
| 2005/0210133 A1 | 9/2005 | Florissi et al. |
| 2005/0240967 A1 | 10/2005 | Anderson et al. |
| 2006/0018254 A1 * | 1/2006 | Sanders et al. ................. 370/216 |
| 2006/0035610 A1 | 2/2006 | Potrebic |
| 2006/0050184 A1 | 3/2006 | McMiller et al. |
| 2006/0064726 A1 * | 3/2006 | Loner .............................. 725/68 |
| 2006/0083315 A1 | 4/2006 | Sato et al. |
| 2006/0085834 A1 | 4/2006 | Chang et al. |
| 2006/0098735 A1 | 5/2006 | Chang |
| 2006/0126634 A1 | 6/2006 | Park |
| 2006/0166699 A1 | 7/2006 | Aghvami et al. |
| 2006/0198389 A1 | 9/2006 | Eriokson et al. |
| 2006/0242674 A1 | 10/2006 | Medford et al. |
| 2007/0022438 A1 | 1/2007 | Arseneau et al. |
| 2007/0040933 A1 | 2/2007 | Seong |
| 2007/0053379 A1 | 3/2007 | Hershey et al. |
| 2007/0079351 A1 | 4/2007 | Wang et al. |
| 2007/0091857 A1 | 4/2007 | Elstermann |
| 2007/0094691 A1 | 4/2007 | Gazdzinski |
| 2007/0136765 A1 | 6/2007 | Shah et al. |
| 2007/0136777 A1 | 6/2007 | Hasek et al. |
| 2007/0157281 A1 | 7/2007 | Ellis et al. |
| 2007/0162927 A1 | 7/2007 | Ramaswamy et al. |
| 2007/0186251 A1 | 8/2007 | Horowitz et al. |
| 2007/0204300 A1 | 8/2007 | Markley et al. |
| 2007/0204311 A1 | 8/2007 | Hasek et al. |
| 2007/0261073 A1 * | 11/2007 | Blumenschein et al. ....... 725/19 |
| 2007/0263627 A1 | 11/2007 | Karino et al. |
| 2007/0268817 A1 | 11/2007 | Smallegange et al. |
| 2007/0291713 A1 | 12/2007 | Machida |
| 2008/0066096 A1 | 3/2008 | Wollmershauser et al. |
| 2008/0069155 A1 | 3/2008 | Honhart |
| 2008/0101455 A1 | 5/2008 | Scheelke |
| 2008/0137543 A1 | 6/2008 | Mitra |
| 2008/0201748 A1 | 8/2008 | Hasek et al. |
| 2008/0282011 A1 | 11/2008 | Tsai et al. |
| 2008/0291907 A1 | 11/2008 | Rogasch |
| 2009/0022241 A1 | 1/2009 | Fukuoka et al. |
| 2009/0052323 A1 | 2/2009 | Breynaert et al. |
| 2009/0066848 A1 * | 3/2009 | St. Laurent et al. .......... 348/731 |
| 2009/0067365 A1 | 3/2009 | Pham et al. |
| 2009/0067432 A1 * | 3/2009 | St. Laurent et al. ....... 370/395.1 |
| 2009/0067433 A1 * | 3/2009 | St. Laurent et al. ....... 370/395.1 |
| 2009/0067490 A1 | 3/2009 | Barroso |
| 2009/0069021 A1 | 3/2009 | Barroso |
| 2009/0070824 A1 | 3/2009 | Barroso |
| 2009/0070825 A1 * | 3/2009 | Pham et al. ...................... 725/68 |
| 2009/0070830 A1 * | 3/2009 | Pham et al. ...................... 725/71 |
| 2009/0070846 A1 * | 3/2009 | St. Laurent et al. .......... 725/131 |
| 2009/0109836 A1 * | 4/2009 | Wasden et al. ................ 370/216 |
| 2009/0109883 A1 * | 4/2009 | Wasden et al. ................ 370/310 |
| 2009/0110052 A1 * | 4/2009 | Wasden et al. ........... 375/240.01 |
| 2009/0113490 A1 * | 4/2009 | Wasden et al. .................. 725/67 |
| 2009/0213814 A1 | 8/2009 | Heo et al. |
| 2009/0254962 A1 | 10/2009 | Hendricks et al. |
| 2010/0208595 A1 | 8/2010 | Zhao et al. |

\* cited by examiner

METHOD AND SYSTEM FOR MONITORING AND ENCODING SIGNALS IN A LOCAL FACILITY AND COMMUNICATING THE SIGNALS BETWEEN A LOCAL COLLECTION FACILITY AND A REMOTE FACILITY USING AN IP NETWORK

TECHNICAL FIELD

The present disclosure relates generally to communication systems, and more particularly to a method and system for receiving signals at a local collection facility and communicating between a local collection facility and a remote facility.

BACKGROUND

The statements in this section merely provide background information related to the present disclosure and may not constitute prior art.

Satellite broadcasting of television signals has increased in popularity. Satellite television providers continually offer more and unique services to their subscribers to enhance the viewing experience. Providing reliability in a satellite broadcasting system is therefore an important goal of satellite broadcast providers. Providing reliable signals reduces the overall cost of the system by reducing the number of received calls at a customer call center.

In satellite broadcasting systems, users have come to expect the inclusion of local channels in addition to the channels broadcast for the entire Continental United States. Collecting the channels may be performed in various manners, including providing a manned station that receives the signals. The signals may be uplinked from various locations. Providing manned stations increases the labor costs and thus increases the overall cost of the service.

SUMMARY

The present disclosure provides a means for receiving and monitoring signals at a local collection facility and communicating between a local collection facility and a remote collection facility. The system may be suitable for collecting television signals and communicating them to a remote facility such as an uplink facility.

In one aspect of the invention, a method includes receiving channel signals at a local collection facility, encoding the channel signals into respective (Internet Protocol) IP signals, communicating the respective IP signals through an IP network to a remote facility, controlling an antenna switch at the local collection facility to communicate a first channel signal of the channel signals to a monitoring receiver circuit module, generating a monitoring signal at the monitoring receiver circuit module, and communicating the monitoring signal through to a remote facility through an IP network.

In another aspect of the invention, a system includes an IP network, a remote facility and a local collection facility in communication with the local collection facility through the IP network. The local collection facility receives channel signals, encoding the channel signals into respective IP signals, communicating the respective IP signals through an IP network to the remote facility. The remote facility controls an antenna switch at the local collection facility to communicate a first channel signal of the channel signals to a monitoring receiver circuit module. The local collection facility generates a monitoring signal at the monitoring receiver circuit module and communicates the monitoring signal through to a remote facility through the IP network.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

The present disclosure is described with respect to a satellite television system. However, the present disclosure may have various uses including satellite data transmission and reception for home or business uses. The system may also be used in a cable system or wireless terrestrial communication system.

Figure 1:
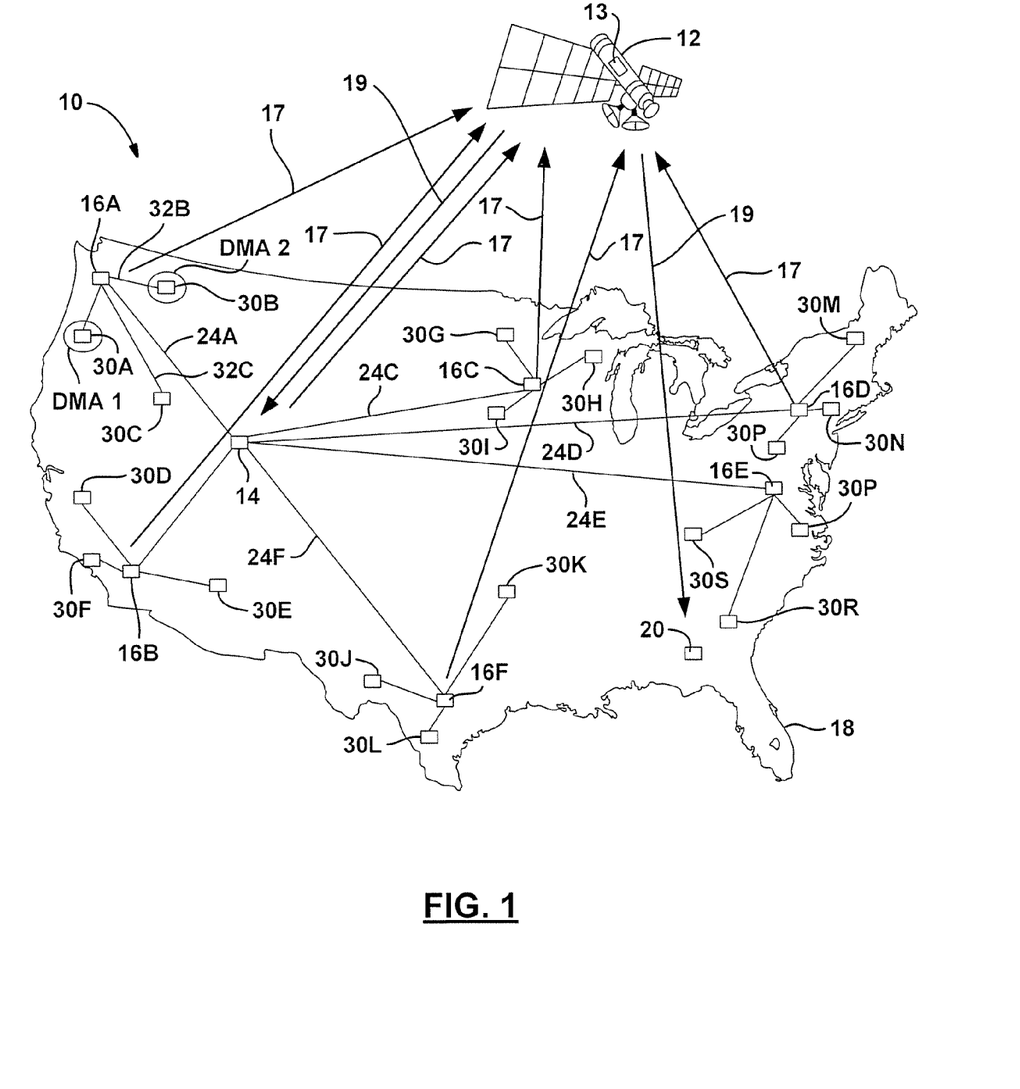
FIG. 1 is an overall system view of a collection and communication system in the continental United States.

Referring now to FIG. 1, a collection and communication system 10 includes a satellite 12 that includes at least one transponder 13. Typically, multiple transponders are in a satellite. Although only one satellite is shown, more than one is possible or even likely.

The collection and communication system 10 includes a central facility or Network operations center (NOC) 14 and a plurality of regional or remote uplink facilities (RUF) 16A, 16B, 16C, 16D, 16E and 16F. In a non-satellite system the facilities may be referred to as a remote facility. The regional or remote uplink facilities 16A-16F may be located at various locations throughout a landmass 18 such as the continental United States, including more or less than those illustrated. The regional or remote uplink facilities 16A-16F uplink various uplink signals 17 to satellite 12. The satellites downlink signals 19 to various users 20 that may be located in different areas of the landmass 18. The users 20 may be mobile or fixed users. The uplink signals 17 may be digital signals such as digital television signals or digital data signals. The digital television signals may be high definition television signals, standard definition signals or combinations of both. Uplinking may be performed at various frequencies including Ka band. The present disclosure, however, is not limited to Ka band. However, Ka band is a suitable frequency example used throughout this disclosure. The central facility or NOC 14 may also receive downlink signals 19 corresponding to the uplink signals 17 from the various regional or remote uplink facilities and from itself for monitoring purposes. The central facility 14 may monitor and control the quality of all the signals broadcast from the system 10.

The central facility 14 may also be coupled to the regional or remote uplink facilities through a network such as a computer network having associated communication lines 24A-24F. Each communication line 24A-F is associated with a respective regional or remote uplink site 16. Communication lines 24A-24F are terrestrial-based lines. As will be further described below, all of the functions performed at the regional or remote uplink facilities may be controlled centrally at the central facility 14 as long as the associated communication line 24A-F is not interrupted. When a communication line 24A-F is interrupted, each regional or remote uplink site 16A-F may operate autonomously so that uplink signals may continually be provided to the satellite 12. Each of the regional or remote uplink and central facilities includes a transmitting and receiving antenna which is not shown for simplicity in FIG. 1.

Each of the regional or remote uplink facilities 16A-16F may also be in communication with a local collection facility collectively referred to with reference numeral 30. As illustrated in FIG. 1, three local collection facilities are associated with each remote uplink facility 16. For example, remote uplink facility 16A has local collection facilities 30A, 30B and 30C associated therewith. Local collection facilities 30D-30S are associated with one of the other remote uplink facilities 16B-16F. Although only three local collection facilities are illustrated for each remote uplink facility 16, numerous local collection facilities may be associated with each remote uplink facility 16. The number of local collection facilities 30 may be numerous, such as 40 for each remote uplink facility. The number of local collection facilities 30 is limited by the amount of equipment and the capabilities thereof associated with each remote uplink facility 16.

The local collection facilities 30 are used for collecting local television stations in various designated marketing areas (DMA). As is illustrated, local collection facility 30A is located in DMA1 and local collection facility 30B is located in DMA2. For simplicity, only two DMAs are illustrated. However, each local collection facility may be located in a DMA.

The local collection facilities 30 may be in communication with each remote uplink facility 16 through a communication network 32. As will be described below, the communication network 32 may be an internet protocol (IP) network. The signals from the local collection facilities 30 may thus be video-over-IP signals. Each of the remote uplink facilities 16 are in communication with each local collection facility 30 through the communication network 32. As is illustrated, local collection facility 30A is in communication with the remote uplink facility 16A through communication network 32A, while local collection facility 30B is in communication with the remote uplink facility 16A through communication network 32B, and so on.

Figure 2:
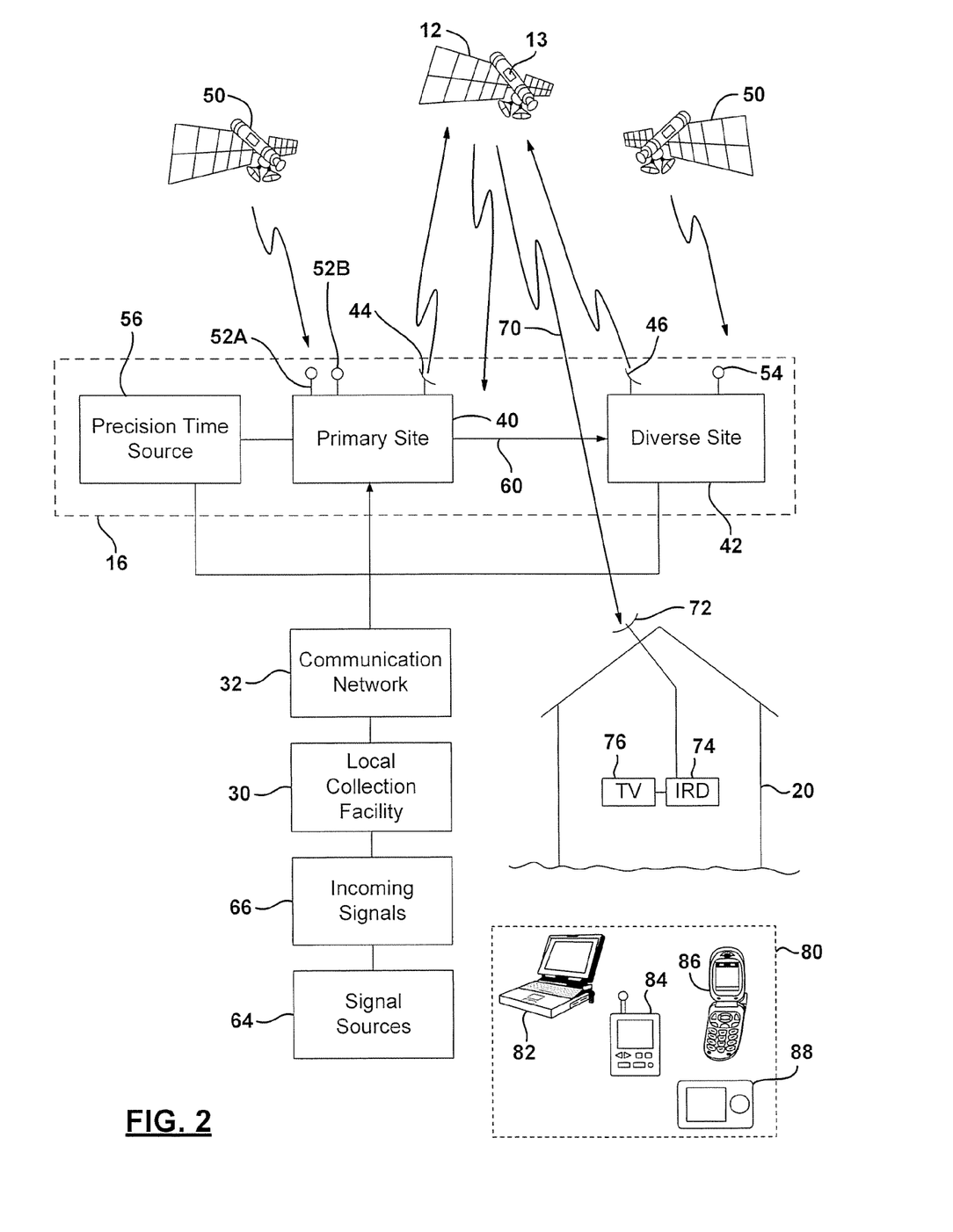
FIG. 2 is a system view at the regional level of the collection and communication system.

Referring now to FIG. 2, the regional or remote uplink facilities 16A-16F of FIG. 1 is illustrated collectively as reference numeral 16. The regional facilities 16 may actually comprise two facilities that include a primary site 40 (such as the remote uplink facility 16 above) and a diverse site 42. The primary site 40 may be referred to as a primary broadcast center (PBC). As will be described below, the central site 14 may also include a primary site and diverse site as is set forth herein. The primary site 40 and diverse site 42 of both the central and regional sites may be separated by at least 25 miles, or, more even more such as, at least 40 miles. In one constructed embodiment, 50 miles was used. The primary site 40 includes a first antenna 44 for transmitting and receiving signals to and from satellite 12. Diverse site 42 also includes an antenna 46 for transmitting and receiving signals from satellite 12.

Primary site 40 and diverse site 42 may also receive signals from GPS satellites 50. GPS satellites 50 generate signals corresponding to the location and a precision timed signal that may be provided to the primary site 40 through an antenna 52 and to the diverse site 42 through an antenna 54. It should be noted that redundant GPS antennas (52A,B) for each site may be provided. In some configurations, antennas 44 and 46 may also be used to receive GPS signals.

A precision time source 56 may also be coupled to the primary site 40 and to the diverse site 42 for providing a precision time source. The precision time source 56 may include various sources such as coupling to a central atomic clock. The precision time source 56 may be used to trigger certain events such as advertising insertions and the like.

The primary site 40 and the diverse site 42 may be coupled through a communication line 60. Communication line 60 may be a dedicated communication line. The primary site 40 and the diverse site 42 may communicate over the communication line using a video over internet protocol (IP).

Various signal sources 64 such as an optical fiber line, copper line or antennas may provide incoming signals 66 to the local collection facility 30. Incoming signal 66, as mentioned above, may be television signals. The television signals may be over-the-air high-definition signals, over-the-air standard television signals, or high or standard definition signals received through a terrestrial communication line. The incoming signals 66 such as the television signals may be routed from the local collection facility 30 through the communication network 32 to the primary site 40, or the diverse site 42 in the event of a switchover. The switchover may be manual or a weather-related automatic switchover. A manual switchover, for example, may be used during a maintenance condition.

Users 20 receive downlink signals 70 corresponding to the television signals. Users 20 may include home-based systems, business-based systems or multiple dwelling unit systems. As illustrated, a user 20 has a receiving antenna 72 coupled to an integrated receiver decoder (IRD) 74 that processes the signals and generates audio and video signals corresponding to the received downlink signal 70 for display on the television or monitor 76. It should also be noted that satellite radio receiving systems may also be used in place of the IRD 74. The integrated receiver decoder 74 may be incorporated into or may be referred to as a set top box.

The user 20 may also be a mobile user. The user 20 may therefore be implemented in a mobile device or portable device 80. The portable device 80 may include but are not limited to various types of devices such as a laptop computer 82, a personal digital assistant 84, a cellular telephone 86 or a portable media player 88.

Figure 3:
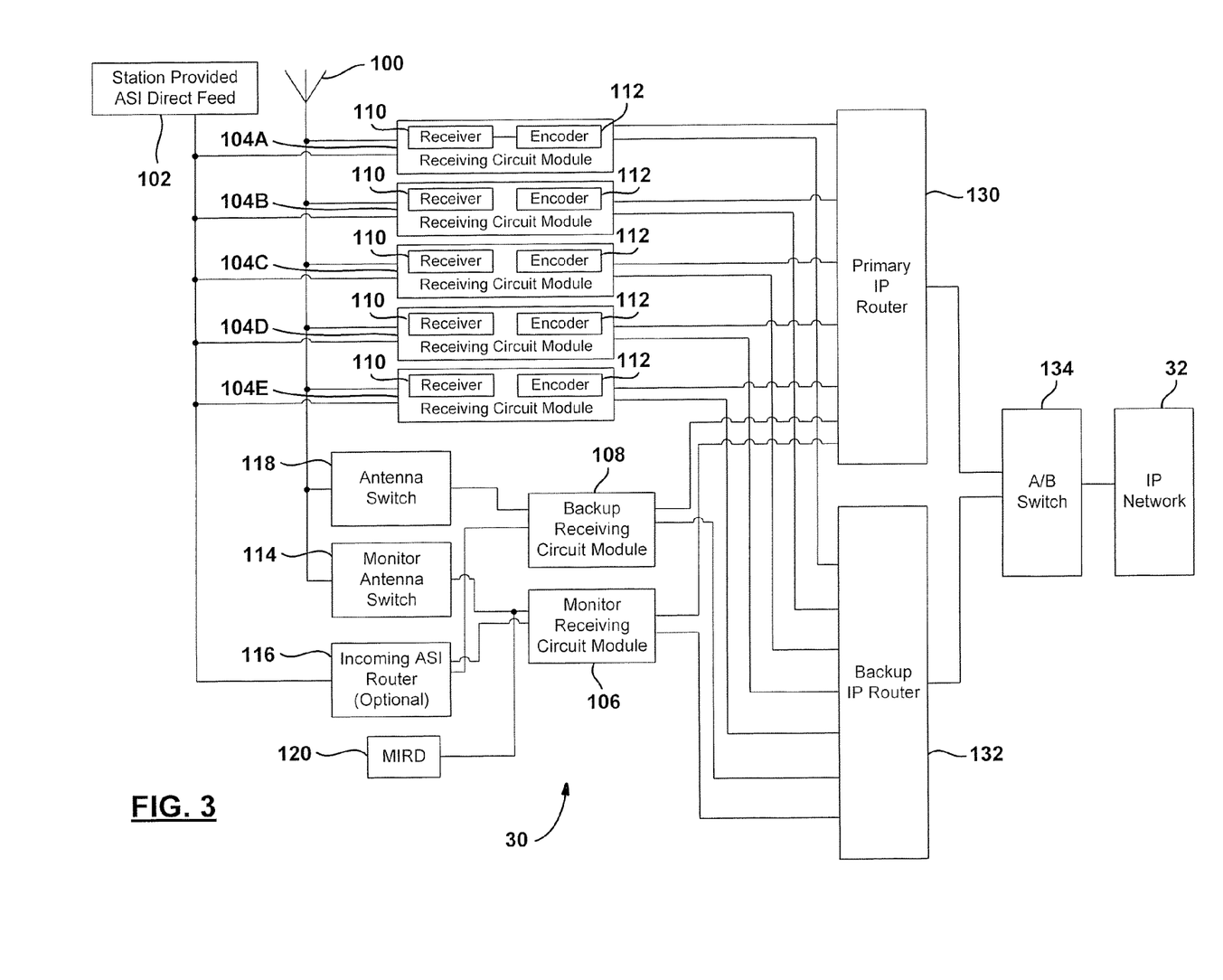
FIG. 3 is a detailed block diagrammatic view of a local collection facility illustrated in FIGS. 1 and 2.

Referring now to FIGS. 3, the local collection facility 30 is illustrated in more detail adjacent to the remote uplink facility (RUF) 16. As mentioned above, the local collection facility 30 is in communication with the remote uplink facility 16 through a network 32 such as an IP network. The local collection facility 30 is used for collecting signals in a designated marketing area or other area. The channel signals may be received as over-the-air television signals or through a direct local feed 102 such as an optical fiber or wire. The direct feed 102 may be in the form of an asynchronous series interface (ASI) signal. For an over-the-air signal, an antenna or plurality of antennas 100 are provided. The router signals are communicated to a plurality of receiver circuit modules 104A-E (collectively referred to as 104). The number of receiver circuit modules 104 depends upon various design parameters such as how many channels the designated market includes. Various numbers of receiver circuit modules 104 may be provided.

In addition to the receiver circuit modules 104, a monitor receiver circuit module 106 and a back-up receiver circuit module 108 may be included at the local collection facility 30. Each of the receiver circuit modules 104, 106, 108 may be monitored by a monitoring system as will be described below.

The details of the receiver circuit modules 104A-E, 106 and 108 will be further described below. The receiver circuit modules 104, 106, 108 generally include a receiver module 110 and an encoder module 112. The receiver module 110 is used to tune, demodulate and decode the over-the-air signals. The decoder within the receiver module 110 may decode received signals from MPEG2 format. The receiver circuit module 110, as will be described below, may include an Advanced Television System Committee (ATSC) receiver or a National Television System Committee (NTSC) receiver. The receive signals are processed and encoded into a format such an IP format in the encoder 112. The encoder 112 may encode into MPEG4 format.

The monitor receiver circuit module 106 is used for generating monitor signals for one of the received channel signals. That is, although only one monitor receiver module 106 may be provided, the monitoring system may monitor one of the channel signals. This may be performed remotely through the network 32 from the remote uplink facility 16.

An incoming ASI router which is optional may also be in communication with the monitor receiving circuit module 106. The incoming ASI router 116 receives signals through the direct feed 102. The router 116 is used to select one of the ASI signals for input to the monitor receiving circuit module 106.

A back-up antenna switch 118 may be used to communicate one of the channel signals from the antenna 100 to the back-up receiving circuit module 108. The back-up antenna switch 118 provides a channel signal to the back-up receiving circuit module 108. Also, the incoming ASI router 116 may also provide a signal to the back-up receiving circuit module 108. The back-up receiving circuit module 108 may be used as a substitute for one of the receiving circuit modules 104A-E in the case of maintenance, failure, or the like.

The output of the receiving circuit modules 104A-E, 106 and 108 are in communication with a primary router 130 and a back-up router 132. A suitable example of a primary and back-up router is a Cisco® 7604. Preferably each of the receiving circuit modules 104, 106 and 108 are in communication with both the primary router 130 and the back-up router 132. An A-B switch 134 is used to generate an output signal corresponding to one of the primary router 130 or the back-up router 132. The routers 130, 132 route the IP signals through the switch 134 and through the network 32 which communicates the encoded channel signals to the remote uplink facility 16, diverse uplink facility and the network operation center. The routers 130, 132 and the switch 134 may be monitored and controlled by the compression system controller or ABMS system described below.

A monitoring integrated receiver decoder (MIRD) 120 may also be provided within each local facility 30. The monitoring IRD 120 may provide monitoring signals to the monitor receiving circuit module 106. More specifically, the monitoring IRD 120 receives signals from the satellite corresponding to a tuned channel. The channel may be tuned through the monitoring system such as the compression system controller or the ABMS system, as will be described below. By providing the monitoring IRD 120, signals received from the satellite and broadcast to a particular local market may be monitored. That is, the same signals received in the local facility over the air or through the direct feed 102 and ultimately uplinked to the satellite may then be monitored by monitoring a downlink of the local signals. The monitoring system may control the tuning of the channel of the monitoring IRD 120. The monitoring system may also be used to monitor the output through the monitor receiving circuit module 106.

Figure 4:
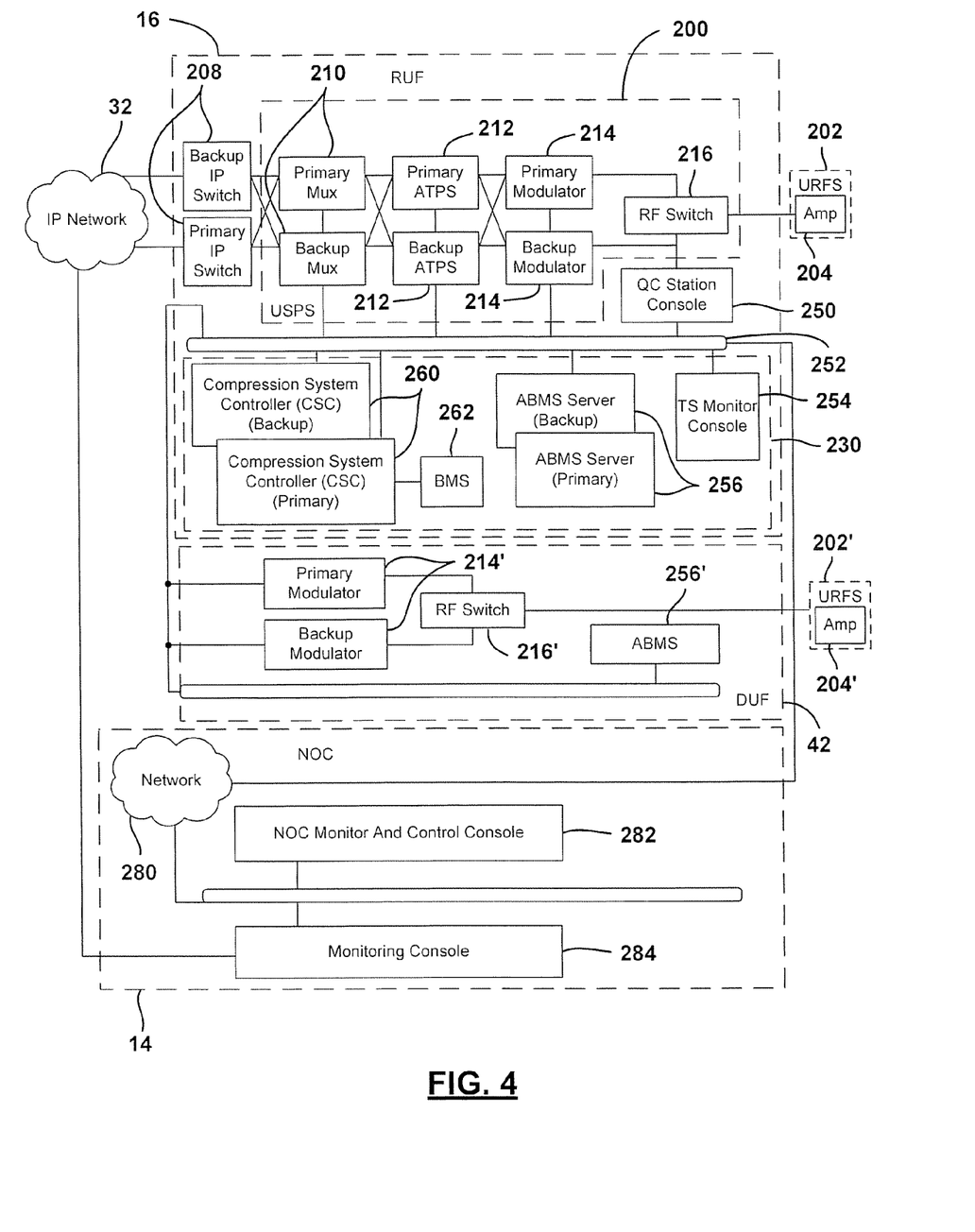
FIG. 4 is a detailed block diagrammatic view of a remote uplink facility.

Referring now to FIG. 4, the remote uplink facility 16 may include an uplink signal processing system (USPS) 200. In a constructed embodiment several uplink signal processing systems 200 may be provided. This may include a secondary or back-up USPS (not shown). The encoded channel signals routed through the network 32 includes identification of the signal so that it may be properly routed to the proper uplink signal processing system. As described below, this may be done by multicasting. The uplink signal processing system 200 generates an output signal to an uplink RF system (URFS) 202 that includes a power amplifier 204. The output signal of each USPS 200 may correspond to one transponder of a satellite. The output signal is a multiplexed signal that may include both high definition television signals and standard definition television signals. The uplink signal processing system 200 may also provide redundant pairs of components to increase the reliability of the output signal. The pairs are provided so that less than the whole primary or secondary chain may be switched. That is, individual primary components may be replaced by back-up components.

The uplink signal processing system 200 may include an IP switch 208, a multiplexer 210, an advance transport processing system (ATPS) 212, and a modulator 214. Pairs of multiplexers 210, advance transport processing systems 212, and modulators 214 may be provided for redundancy. That is primary and back-up pairs of each may be provided.

The multiplexer 210 multiplexes the decoded channel signals from the local area network 32 into a multiplexed transport stream (MPTS). The multiplexer 210 may also act to insert advertising into the signal. Thus, the multiplexer 210 may act as a multiplexing module and as an ad insertion module. The multiplexer 210 may be a statistical multiplexer used to group signals from various local collection facilities. Various numbers of encoded channel signals may be multiplexed. In one constructed embodiment, eight channel signals were multiplexed at each multiplexer 210. The multiplexer 210 may be a statistical multiplexer that may be used to join IP multicast groups together from more than one local collection facility.

The advance transport processing system (ATPS) 212 converts the transport stream from the multiplexer 210 into an advanced transport stream such as the DIRECTV® A3 transport stream. The ATPS 212 may support either ASI or MPEG output interface for the broadcast path. Thus, the ATPS 212 acts as an encryption module.

The modulators 214 modulate the transport stream from the ATPS 212 and generate an RF signal at a frequency such as an L-band frequency. An RF switch 216 is coupled to the primary modulator and back-up modulator 214. The RF switch provides one output signal to the uplink RF system 202. The USPS 200 may also be coupled to a quality control (QC) station console 250. The quality control station console 250 may be coupled directly to the RF switch 216. The quality control station console 250 may also be coupled to a communication monitoring bus 252. The bus 252 may be used to communicate between a monitoring system 230, used for monitoring and controlling the various components in the remote uplink facility, and the local collection facilities. The bus 252 may, for example, be in communication with a technical services (TS) monitor console 254. The bus 252 may also be coupled to an advance broadcast management system (ABMS) server 256. Both a primary server and a back-up server 256 may be used.

A compression system controller 260 may also be coupled to the bus 252 within the monitoring system 230. As is illustrated, both a primary and back-up compression system controller 260 may be provided. The compression system controller 260 may be coupled to a broadcast management system 262 as will be further described below. The ABMS system 256 and the compression system controller 260 may be used to control various functions and monitor various functions of the remote uplink facility and the local collection facilities. These functions will be further described below.

The compression system controller 260 is a centralized server which is used to control and monitor the receiving circuit modules within the chain of a remote uplink facility. The compression system controller 260 may be used to manage, configure, control and monitor the receiving circuit modules and the encoders therein. The compression system controller 260 may also control the routers, switches and receivers within the receiving circuit modules. The compression system controller 260 may be physically located within the remote uplink facility. However, web access may be provided through a standard web browser for allowing users to interface, configure and control the various systems. In addition to controlling the receiving circuit modules and the statistical multiplexers, the compression system controller 260 may be used to initiate a redundancy switch to a back-up receiving circuit module or encoder within the local collection facilities. The compression system controller 260 may also be used to initiate a switch to a back-up statistical multiplexer within the remote uplink facility 16. The compression system controller may also be used to update the remote broadcast management system 262.

Each of the components of the USPS 200 may be coupled to the bus 252. That is, the primary and back-up multiplexers 210, the primary and back-up ATPS's 212, the primary and back-up modulators 214 and the RF switch 216 may all be coupled to the bus 252.

The ABMS system 256 may be used for various monitoring and controlling functions at the remote facility and the various local facilities. Monitoring may include monitoring transport level errors, video outages, audio outages, loss of connection from a redundancy controller or a data source or a compression system controller 260.

The remote uplink facility may also include the diverse uplink facility or diverse site 42. The diverse site may receive signals from the primary ATPS 212 in the event of a modulator 214 or switch failure 216. The transport stream signals provided from the primary advanced transport processing system 212 are communicated to the primary modulator and back-up modulator 214' of the diverse facility 42. An RF switch 216' may be used to couple the output of either the primary modulator or the back-up modulator 214' to the uplink RF system 202. The ABMS system 256' may also be used to monitor the output of the diverse uplink facility 256'.

The network operation center 14 may be coupled the IP network 32. The network operation center may also be coupled to the remote uplink facility through an ATM or IP network 280. The network operation center may have a monitor and control console 282 and a monitoring decoder 284 for monitoring and controlling various functions of the various remote uplink facilities. The network operation center monitor and control console 282 may also be used to control and monitor the various local collection facilities 30. This may be performed directly or through the compression system controller 260.

Figure 5:
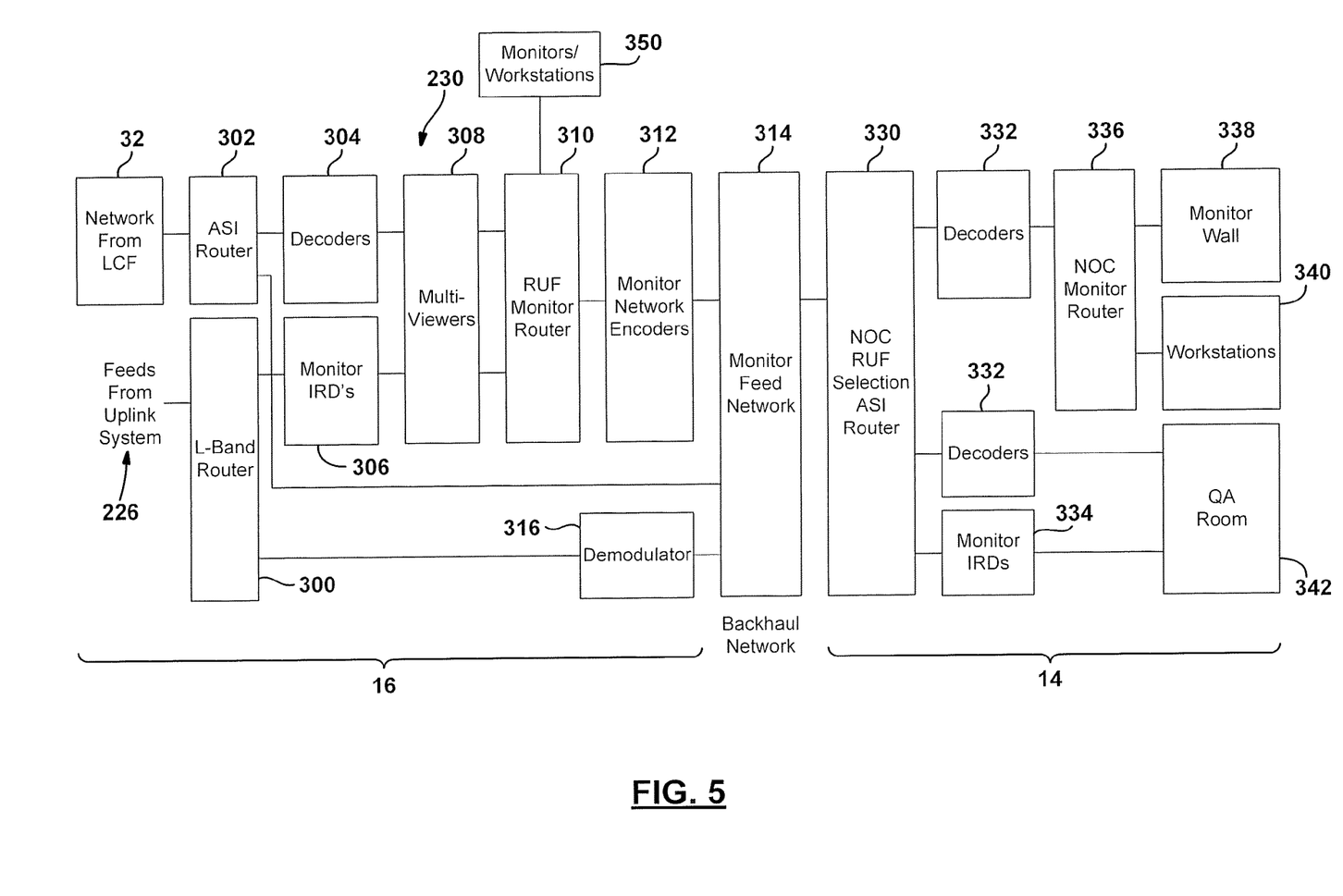
FIG. 5 is a block diagrammatic view of a monitoring system of FIG. 3.

Referring now to FIG. 5, the monitoring system 230 of FIG. 4 is illustrated in further detail. The monitoring system receives signals through the network 32. As mentioned above, feeds from various uplink systems such as various IF switches 226, may be provided to an L-band router 300. An ASI router 302 may be used to route the signals from the local collection facilities to a decoder 304. The decoder may be an ATSC decoder. Decoder 304 may be optional should the signals already be decoded at the local collection facility. The L-band router 300 may be in communication with a monitor IRD 306. The output of the monitor IRD 306 and the decoders 304 are provided to a multi-viewer or plurality of multi-viewers 308. A remote uplink facility monitor router 310 is used to provide signals to the monitor network encoders 312 which in turn provide signals to a monitor feed network 314. The L-band routers may also provide signals to a demodulator 316. The output of the demodulator 316 and the monitor network encoders 312 may be provided to the monitor feed network 314. The monitor feed network 314 may be various types of transmission means used to communicate between the remote uplink facilities 16 and the network operation center 14.

The remote uplink facility 16 may generate monitoring display 350 as well. The monitoring displays 350 may also be used to control the various functions at the local collection facilities. The monitoring displays may be in communication with the monitor router 310.

The network operation center 14 may include an ASI router 330 for the selection of signals from a particular remote uplink facility. The ASI signals may be routed to an ATSC decoder 332 and a monitor IRD 334. The ATSC decoder 332 may provide the signals to a monitor router 336. A monitor wall 338 may be used to generate monitoring signals for use at the network operation center. A workstation 340 may also receive the signals from the network operation center monitor router 336. The ATSC decoders 332 and the monitor IRDs 334 may provide the signals to a quality assurance (QA) room 342. Screen displays at the monitor wall 338, the workstation 340 and the quality assurance room 342 are used for monitoring the various remote uplink facilities. The workstation 340 may also be used for control purposes. Signals are provided to the remote uplink facility and ultimately to the local collection facilities should a problem arise with the signals. Ultimately the control signals may be communicated back through the network 32.

The network operation center 14 may also include multiple workstations 340 as well as a large monitor wall 338. The workstations 340 may have access to various control surfaces that can configure the monitor walls 338 as well as signals fed to the various monitors at the station.

Control of the on-air failure recovery devices as well as the monitoring functions for every LCF and RUF are accomplished through control surfaces such as touch screens and keyboards together with a GUI at the workstations 340 in the network operation center 14. The control surfaces may be application-specific and present the status and control options for various multiple configurations for the application. The quality assurance room 342 may not have any control functions therein. The monitors 350 may be coupled to the monitor network encoders 315 for displaying various views from the remote uplink facility and the local collection facilities.

Further, the decoders 332 may be MPEG decoders since the signal may be in MPEG form (IP) when received from the remote uplink facility.

Figure 6A:
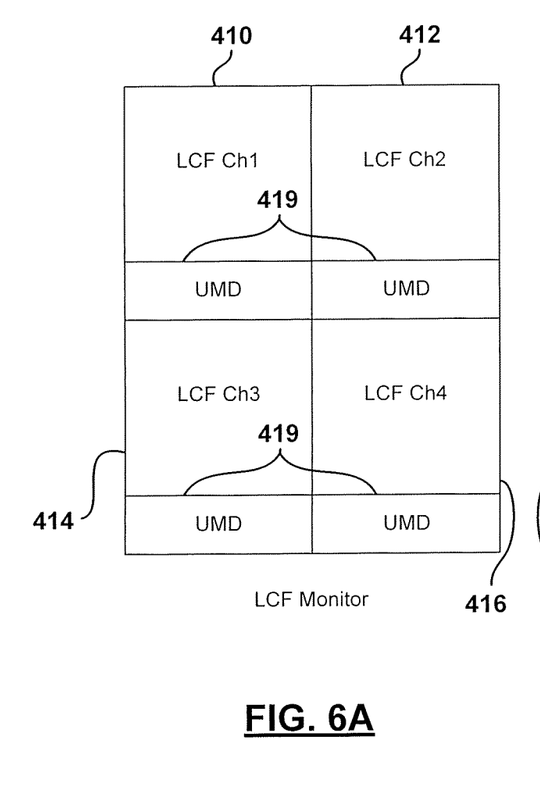
FIG. 6A is a plan view of a local collection receiver monitoring display.

Referring now to FIG. 6A, a local collection facility monitor within a remote facility is generated having four local collection facility channels 410, 412, 414, and 416. Each display may also include an under-monitor display 418 used to identify the particular channel signal. The under-monitor displays 418 may display the actual channel number, the station identification or other information and the like.

Figure 6B:
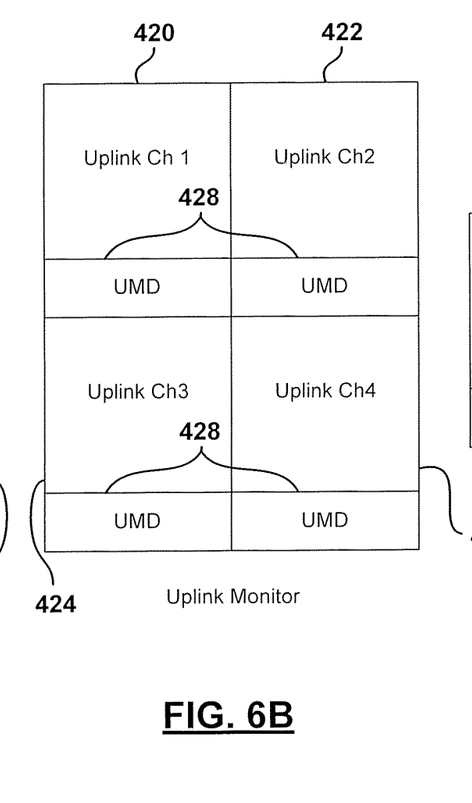
FIG. 6B is a plan view of an uplink monitoring display.

In FIG. 6B, an uplink monitor is illustrated having an uplink channel one 420, an uplink channel two 422, an uplink channel three 424, and an uplink channel four 426. An under-monitor display 428 may also be included with each of the displays 420-426. The uplink channels receive the uplink channel signals so that they may be monitored. The uplink channel signals provide an indication as to the uplink channel. Various selections may be made for the particular uplink channels for the particular remote uplink facilities.

Figure 6C:
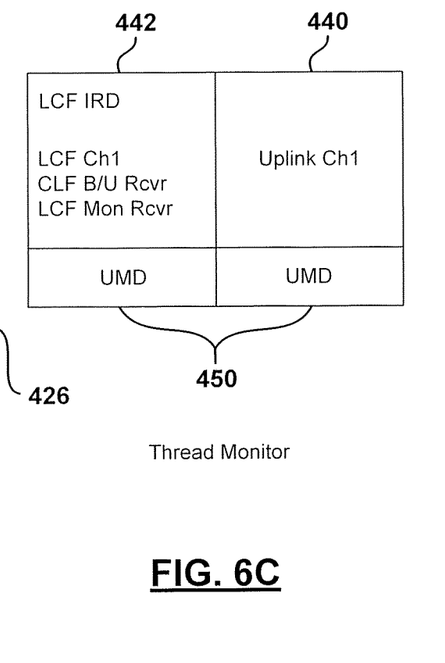
FIG. 6C is a plan view of a thread monitoring display.

FIG. 6C includes an uplink channel signal 440 and a local collection facility IRD signal 442. The local collection facility IRD signal 442 may be received through the monitoring IRD located at the local collection facility. This is illustrated in FIG. 3 as reference numeral 120. The display may also display a channel from the local collection facility, the back-up receiver channel or the local collection facility monitor receiver. Both displays 440 and 442 may include an under-monitor display 450.

Figure 7:
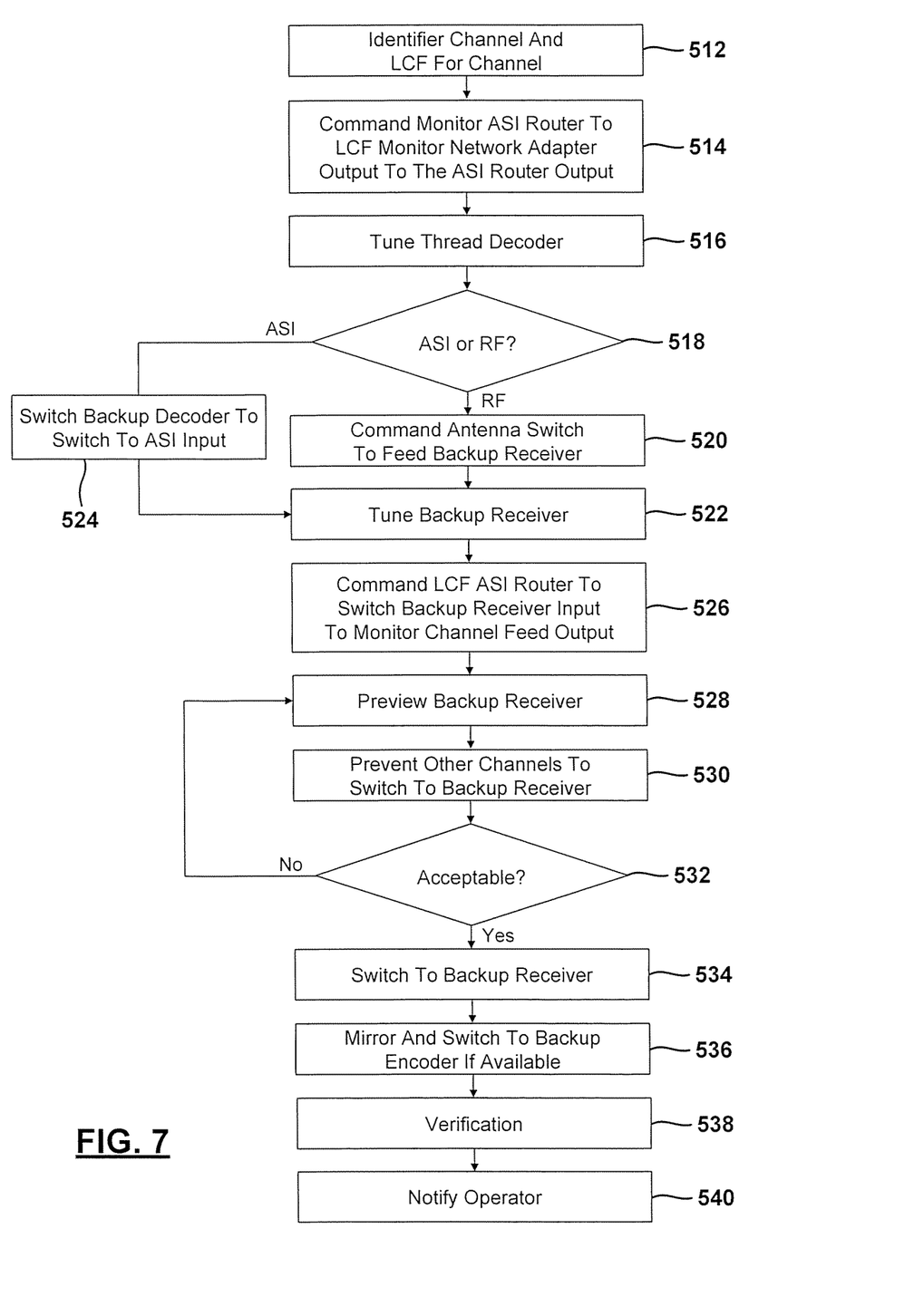
FIG. 7 is a flowchart illustrating a method for controlling a back-up receiver decoder circuit module at the local collection facility from a remote facility.

Referring now to FIG. 7, a method for changing or controlling a back-up receiving circuit module at a local collection facility from a remote collection facility is illustrated. In step 512, the monitoring system 230 identifies a channel and a local collection facility associated with the channel. This may be performed at a broadcast operation center channel or the like. This may also be performed at the network operation center 14. The channel may be identified by using the various monitors at the network operation center or the remote uplink facility as described above.

In step 514, the method includes commanding the monitor ASI router 302 of FIG. 5 to switch to the router input corresponding to the designated LCF monitor network adapter output to the ASI router output defined for the requesting console thread decoder input. The thread decoder may then be tuned to the station identification defined for the local channel source for the broadcast operation center in step 516. In step 518, it is determined whether the signal is an ASI signal received through a direct feed or an RF signal communicated through an RF antenna. In step 520, if the signal is an RF signal, the antenna switch 118 of FIG. 3 is commanded to feed the back-up receiver and the back-up receiver module 108 is tuned in step 522. It should be noted that the back-up receiver may be tunable, whereas the other receivers in the receiver circuit modules 104 may be fixed-tuned.

Referring back to step 518, if the signal is an ASI signal, the back-up receiver module is switched to the particular ASI input. This may be done through the ASI router 116 of FIG. 3. After step 524, the back-up receiver is tuned in step 522.

In step 526, the local collection facility ASI router is commanded to switch to the back-up receiver input to monitor the channel feed output at the network adapter. In step 528, a preview of the back-up signals is provided at the remote uplink facility. As mentioned above, the signal may also be provided to the network operation center.

In step 530, other channels are prevented to switch to the back-up receiver. In step 532, if the signal is not acceptable a preview is continued in step 528. In step 532, if the previewed signal is acceptable a switch to the back-up receiver is performed in step 534. In step 538, the monitoring system commands the system to mirror and switch to the back-up encoder if available. Mirroring means communicating any of the set-up configuration parameters from the receiver circuit module in question to the backup receiver circuit module. In step 538, if verification is received that the back-up receiver has been employed in the broadcast signal. In step 540, a notification is provided to the operation that a successful transition to the back-up encoder is provided.

Figure 8:
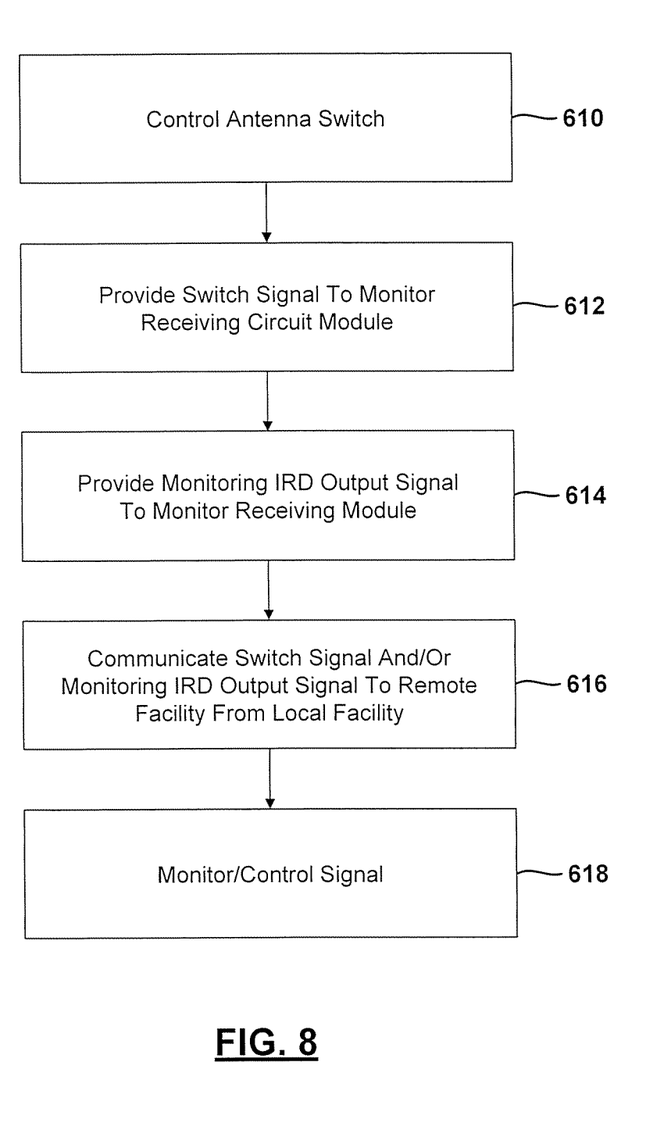
FIG. 8 is a flowchart of a method for controlling monitoring in the local collection facility.

Referring now to FIG. 8, a method of controlling the monitoring portion of the local collections facility is illustrated. To monitor a particular channel, the antenna switch may be switched to receive an ASI signal or an over-the-air antenna signal. The monitor antenna switch 114 of FIG. 3 may be controlled through the routers 130, 132 from the monitoring and control system. The signal from the switch 114 is provided to the monitor receiving circuit module 106 of FIG. 3. In addition, the monitoring IRD 120 of FIG. 3 may generate an output signal. The output signal may be tuned or controlled from the monitoring system through the routers 130, 132. In step 614, the monitoring IRD output signal is provided to the monitor receiving module where it is provided to the monitoring system through the routers 130, 132.

In step 616, the switch signal or the monitoring IRD output signal, or both, are provided to the remote facility from the local facility through the routers 130, 132. In step 618, the signals are monitored and controlled at the monitoring system. The monitor receiving circuit may be used for monitoring various signals including a received antenna signal downlinked from the satellite so that verification of the entire process may be monitored.

Figure 9:
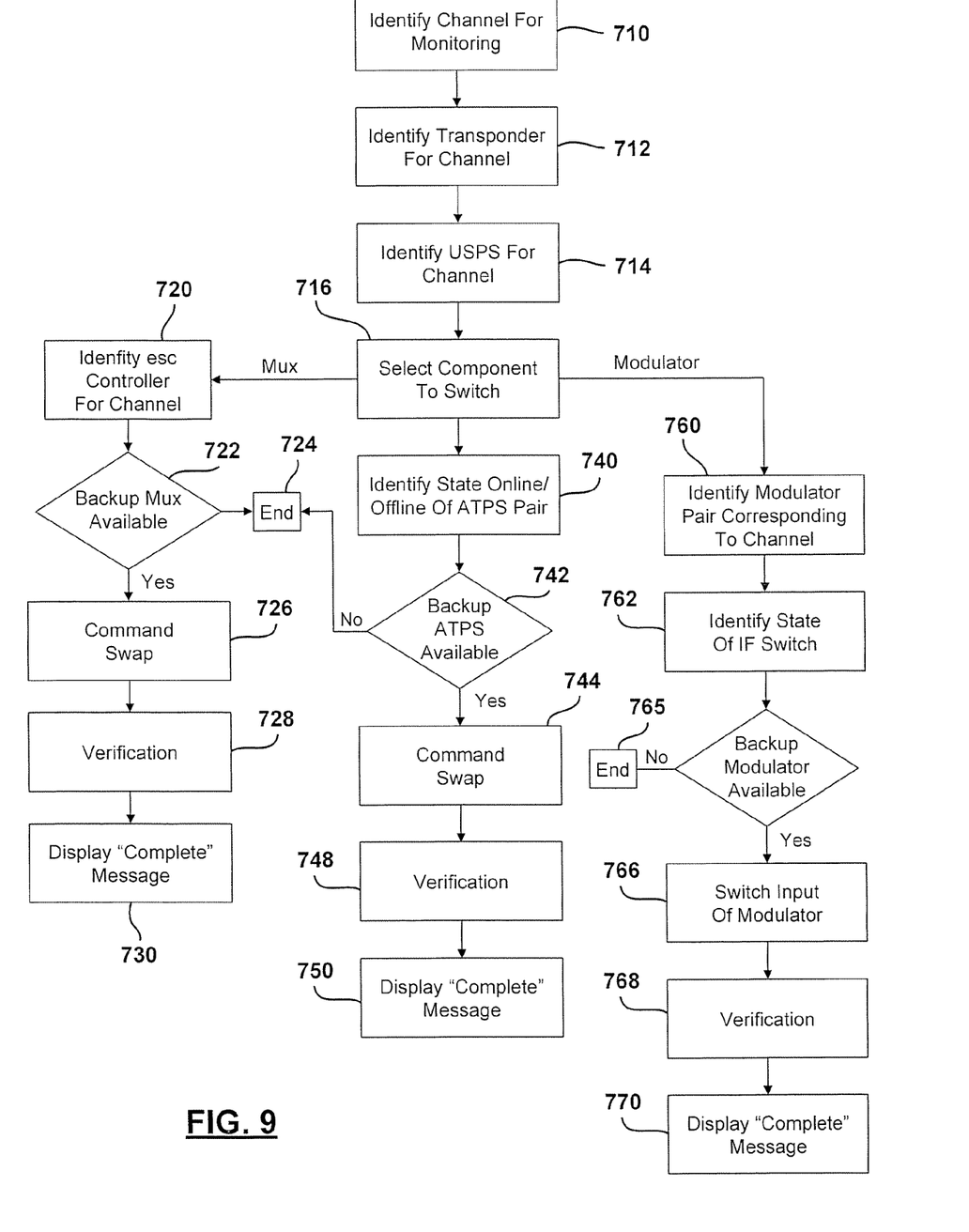
FIG. 9 is a flowchart with a method of controlling redundancy of components of a remote facility.

Referring now to FIG. 9, a method for monitoring and controlling the remote facility is illustrated. In this example, various aspects of the remote facility may be monitored and controlled. For example, the multiplexers 210, the ATPS 212, the primary modulator 214 may all be switched from primary to back-up modulators individually. In step 710, a channel for monitoring is identified in the monitoring system. In step 712, the transponder corresponding to the channel is identified. As mentioned above, more than one local collection facility may feed a particular transponder. Each USPS 200 corresponds to a plurality of signals that may be from various local collection facilities. In step 714, the USPS for the particular channel is identified. In step 616, a component to switch is determined. If a multiplexer is chosen, step 720 is performed. In step 720, an identification of the CSC controller for the particular channel is chosen. In step 722, it is determined whether a back-up multiplexer is available. If no back-up multiplexer is available, step 724 is performed. In step 722, if a back-up, back-up multiplexer is available, step 726 is performed. In step 726, a command is generated for swapping between the primary and back-up multiplexer. This may be performed with one of the various screens identified above. In step 728, a verification is generated to confirm that a switch from a primary to a back-up multiplexer has taken place. In step 730, a "complete" message may be generated by the system to indicate to the operator that switching from a primary to a back-up multiplexer has been performed. It should be noted that the above steps and the steps described below for switching may be performed at a primary or engineering USPS.

Referring back to step 716, if an ATPS system is selected for component switching, step 740 identifies the state of the ATPS pair. The state may include an on-line and off-line status for each ATPS. In step 742, if the back-up ATPS is not available, step 724 is executed in which the system ends. In step 742, if a back-up ATPS is available, step 744 commands a swap from the primary to the back-up ATPS. In step 748, a verification signal is generated to the monitoring system to confirm that a switch has been performed. In step 750, a "complete" message may also be generated to indicate that the switch from the primary to the back-up ATPS may be performed or was performed.

Referring back to step 716, if the modulator was the component to switch, then step 760 is performed. In step 760, a modulator pair corresponding to the channel is identified. In step 762, the state of the IF or RF switch is identified. In step 764, if the back-up modulator is available or is not available, step 765 ends the process. In step 764, if a back-up modulator is available, step 766 commands the switch to switch inputs from the primary to the back-up modulator. In step 768, verification is performed to verify that a switch is taking place. In step 770, a "complete" message may be generated to verify that switching from the primary to a back-up modulator has been performed.

As can be seen above, only one of the multiplexers, ATPS, or modulator may be selected for switching. In other words, less than the entire USPS chain may be switched. The above process may be performed depending on the transponder redundancy mode in the monitoring system. In a manual mode, individual components may be requested to be switched to the back-up function. In an automated mode, only the entire chain may be switched. That is, the primary multiplexer 210, ATPS 212, and modulator 214 may be switched from the primary ATPS to the back-up ATPS.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
   receiving channel signals at a local collection facility;
   encoding the channel signals into respective IP signals;
   communicating the respective IP signals through an IP network from the local collection facility to a remote facility;
   controlling an antenna switch at the local collection facility to communicate a first channel signal of the channel signals to a monitoring receiver circuit module;
   generating a monitoring signal at the monitoring receiver circuit module;
   communicating the monitoring signal to a remote facility through an IP network;
   generating a control signal at the monitoring system for controlling the antenna switch;
   communicating the control signal through the IP network from the remote facility;
   controlling the antenna switch at the local collection facility to communicate a second channel signal of the channel signals to the monitoring receiver circuit module; and
   switching the antenna switch in response to the control signal.

2. A method as recited in claim 1 further comprising receiving a downlink signal at a monitoring integrated receiver decoder at the local collection facility.

3. A method as recited in claim 2 further comprising encoding the downlink signal into a downlink monitor IP signal.

4. A method as recited in claim 3 further comprising communicating the downlink monitor signal to the remote facility.

5. A method as recited in claim 4 further comprising controlling a backup receiving circuit module in response to the downlink monitor signal from the remote facility.

6. A method as recited in claim 2 further comprising tuning the monitoring integrated receiver decoder from the remote facility.

7. A method as recited in claim 1 further comprising controlling a backup receiving circuit module in response to the monitoring signal.

8. A method as recited in claim 1 wherein the respective IP signals comprises video-over-IP signals.

9. A method as recited in claim 1 further comprising multiplexing the respective IP signals to form a multiplexed signal;
   forming a transport stream signal from the multiplexed signal;
   modulating the transport stream signal to form a modulated signal;
   forming uplink signals from the modulated signals; and
   uplinking the uplink signals to a satellite from the remote facility.

10. A method comprising:
    receiving channel signals at a local collection facility;
    encoding the channel signals into respective IP signals;
    communicating the respective IP signals through an IP network from the local collection facility to a remote facility;
    controlling an antenna switch at the local collection facility from the remote facility through the IP network to communicate a first channel signal of the channel signals to a monitoring receiver circuit module;
    generating a first monitoring signal at the monitoring receiver circuit module;
    communicating the first monitoring signal to a remote facility through an IP network;
    receiving a downlink signal from a satellite at a monitoring integrated receiver decoder at the local collection facility;
    communicating the downlink signal to the monitoring receiver receiving circuit module;
    encoding the downlink signal into a downlink monitor IP signal;
    communicating the downlink monitor IP signal to the remote facility through the IP network;
    displaying the downlink monitor IP signal at a display of a monitoring system of the remote facility.

11. A method as recited in claim 10 further comprising controlling a backup receiving circuit module in response to the downlink monitor signal from the remote facility.

12. A system comprising:
an IP network;
a remote facility comprising a monitoring system and a display associated with the monitoring system; and
a local collection facility in communication with the remote facility through the IP network, said local collection facility receiving channel signals, encoding the channel signals into respective IP signals, communicating the respective IP signals through the IP network to the remote facility,
said remote facility controlling an antenna switch at the local collection facility to communicate a first channel signal of the channel signals to a monitoring receiver circuit module;
said local collection facility generating a monitoring signal at the monitoring receiver circuit module and communicating the monitoring signal to the remote facility through the IP network;
said monitoring system generating a control signal for controlling the antenna switch and communicating the control signal to the local collection facility through the IP network;
said antenna switch switching the antenna switch to communicate a second channel signal to the monitoring receiver circuit module.

13. A system as recited in claim 12 wherein the local collection facility receives a downlink signal at a monitoring integrated receiver decoder at the local collection facility encodes the downlink signal into a downlink monitor IP signal and communicates the downlink monitor signal to the remote facility.

14. A system as recited in claim 13 wherein the remote facility controls a backup receiving circuit module in response to the downlink monitor signal.

15. A system as recited in claim 14 further comprising tuning the monitoring integrated receiver decoder from the remote facility.

16. A system as recited in claim 12 further comprising a backup receiving circuit module in the local facility said remote facility controlling the backup receiving circuit module in response to the monitoring signal.

17. A system as recited in claim 12 wherein the remote facility comprises a multiplexer multiplexing the respective IP signals to form a multiplexed signal;
a transport module forming a transport stream signal from the multiplexed signal;
a modulator modulating the transport stream signal to form a modulated signal;
an uplink system forming uplink signals from the modulated signals and uplinking the uplink signals to a satellite from the remote facility.

18. A system as recited in claim 12 wherein the IP signals comprise video-over-IP signals.

19. A system as recited in claim 12 wherein the channel signals comprise terrestrial over-the air channel signals received through an antenna.

20. A system as recited in claim 12 wherein the channel signals comprise standard definition terrestrial over-the air channel signals received through an antenna.

21. A system as recited in claim 12 wherein the channel signals comprise high definition terrestrial over-the air channel signals received through an antenna.

22. A system as recited in claim 12 wherein the local collection facility comprises a plurality of local collection facilities.

* * * * *